United States Patent
Sotoyama et al.

(10) Patent No.: US 6,814,995 B1
(45) Date of Patent: Nov. 9, 2004

(54) FOOD MATERIAL AND PROCESS FOR PRODUCING THE SAME, AND CHEESE-LIKE FOOD AND PROCESS FOR PRODUCING THE SAME

(75) Inventors: Kazuyoshi Sotoyama, Zama (JP); Kazuyoshi Doi, Zama (JP); Teruhiko Mizota, Zama (JP); Yuzo Asano, Zama (JP); Kiyotaka Takahashi, Zama (JP); Tadahiro Abe, Zama (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 116 days.

(21) Appl. No.: 10/018,793

(22) PCT Filed: Sep. 27, 2000

(86) PCT No.: PCT/JP00/06644

§ 371 (c)(1),
(2), (4) Date: Dec. 21, 2001

(87) PCT Pub. No.: WO01/80657

PCT Pub. Date: Nov. 1, 2001

(30) Foreign Application Priority Data

Apr. 21, 2000 (JP) .......................................... 2000-121299

(51) Int. Cl.[7] .............................................. A23C 19/00
(52) U.S. Cl. ........................ 426/582; 426/520; 426/524; 426/580
(58) Field of Search ................................ 426/520, 524, 426/580, 582

(56) References Cited

U.S. PATENT DOCUMENTS

| | | | |
|---|---|---|---|
| 4,329,374 A | 5/1982 | Invernizzi et al. | |
| 5,104,675 A | 4/1992 | Callahan et al. | |
| 5,240,724 A | 8/1993 | Otto et al. | |
| 5,249,514 A | 10/1993 | Otto et al. | |
| 5,277,926 A | 1/1994 | Batz et al. | |
| 6,551,637 B1 * | 4/2003 | Fontenille | 426/89 |

FOREIGN PATENT DOCUMENTS

| | | | |
|---|---|---|---|
| EP | 0 815 737 A1 | | 1/1998 |
| GB | 1 434 298 | | 5/1976 |
| JP | 56-75086 A | | 6/1981 |
| JP | 56-75086 A | * | 6/1981 |
| JP | 58198248 | | 11/1983 |
| JP | 60227660 | | 11/1985 |
| JP | 61081770 | | 4/1986 |
| JP | 3058771 | | 3/1991 |
| JP | 3195474 | | 8/1991 |
| JP | 03-221756 | * | 9/1991 |
| JP | 03-2217516 | | 9/1991 |
| JP | 3292855 | | 12/1991 |
| JP | 7-143845 A | * | 6/1995 |
| JP | 7143845 | | 6/1995 |
| JP | 9103242 | | 4/1997 |
| JP | 9154485 | | 6/1997 |
| JP | 09-154486 | * | 6/1997 |
| JP | 9275943 | | 10/1997 |
| JP | 11103773 | | 4/1999 |
| JP | 11-103773 A | * | 4/1999 |
| JP | 2001149008 | | 6/2001 |
| SU | 784 856 A | | 12/1980 |

OTHER PUBLICATIONS

El–Neshwy et al, "Production of Processed Cheese Food Enriched with Vegetable and Whey Proteins", Food Chemistry, 28 (1988) 245–255; XP 002043613.

Edmonds Cookery Book, Published by Bluebird Food Ltd., Auckland, New Zealand, 1992, chese sauce recipe and a lasagna recipe.

* cited by examiner

Primary Examiner—Leslie Wong
(74) Attorney, Agent, or Firm—Nixon & Vanderhye P.C.

(57) ABSTRACT

This invention seeks to provide an all-purpose food material which can be mixed in various kinds of foods, specifically in a cheese-like food in large quantities without limitation. The food material is produced by subjecting a processed cheese-like food to heating and melting treatment at at least 120° C.

2 Claims, No Drawings

FOOD MATERIAL AND PROCESS FOR PRODUCING THE SAME, AND CHEESE-LIKE FOOD AND PROCESS FOR PRODUCING THE SAME

This is a National Stage Filing of PCT/JP00/06644 filed on Sep. 27, 2000.

TECHNICAL FIELD

This invention relates to a food material and a method of production thereof, and to a cheese-like food, and a method of production thereof.

In more detail, this invention relates to a food material produced from a processed cheese-like food, a method of production thereof, a cheese-like food including the food material, and a method of production thereof.

All that is commonly understood by a person skilled in the art to be cheese, natural cheese, or processed cheese are intended to fall within the scope of cheese, natural cheese, or processed cheese used in this invention, which includes cheeses, natural cheeses, and processed cheeses prescribed in Japanese ministerial ordinance concerning compositional standards, etc., for milk and milk products (Japanese Ministry of Health and Welfare Ordinance No. 52, Dec. 27, 1951), component standards in the fair competition rule, and the like. That is, each term of "cheese", "natural cheese", and "processed cheese" is used in the present invention to mean the following.

The "cheese" means natural cheese or processed cheese.

The "natural cheese" means (i) or (ii) described below.

(i) a solid substance or a ripe substance, which is produced by fermenting, with lactic acid bacteria, milk, butter milk (which refers to a portion excepting fatty particles generated in producing butter, and hereinafter is referred to as the same), or cream, or by removing whey from coagulated milk generated by adding an enzyme into the milk, the butter milk, or the cream.

(ii) a substance having chemical, physical, and functional properties similar to those of (i) described above, which is produced from the milk, the butter milk, or the cream, by using a manufacturing technology including coagulation.

In this invention, the "processed cheese" means a substance emulsified after heating and melting crushed natural cheeses.

In this invention, examples of the "cheese food" include all that is commonly understood as a cheese food by persons skilled in the art, specifically produced by crushing at least one kind of the natural cheese or the processed cheese to which is added or is not added an additive which is approved by food sanitation laws or the like, and then mixing, heating and melting, and preferably including the cheese contents in an amount of 51% or more. The "cheese food" may include spices, seasonings, and/or other foods, so as to impart smell and flavor. In this case, the contents of the spices, the seasonings, and the other foods are preferably ⅙ or less, relative to the total weight of the solid contents of a product. The cheese foods' may include fats, proteins, and/or carbohydrates, which are not made from milk. In this case, the contents of the fats, proteins, and carbohydrates are preferably 10% or less, relative to the total weight of the end product.

In this invention, "cheese-like food" refers to a processed food including cheese as one component thereof, and examples thereof include various foods respectively including the cheese as the main component to impart flavor and texture of the cheese (hereinafter, referred to as "materials including cheese as the main component", and the like, as well as the processed cheese and the cheese food.

In this invention, percentages indicate percents by weight, unless otherwise specified.

BACKGROUND ART

The cheese-like food is generally produced by steps of mixing various materials including cheese, and carrying out emulsification treatment while stirring, forming, and cooling. In this specification, "emulsification treatment" is a term meaning a process of emulsifying materials after heating and melting the materials, which is required to produce the cheese-like food.

For example, in the case of the processed cheese, the processed cheese is produced by processes of crushing at least one kind of the natural cheese into pieces, into which water and/or additives such as emulsifying salts, spices, food colours, and/or the like are added and then mixing, as necessary, and treating them by carrying out the emulsification treatment while stirring by means of an emulsifier such as a Vogel or Kustner type cooker, a stephan cooker, a heat exchanger with a scraper, or the like, forming into a desired shape, and cooling.

As a general characteristic of the cheese-like food, it is known that the viscosity of melted cheese-like food is increased when the cheese-like food is treated by the emulsification treatment again after being added into another cheese-like food (see, tor example, "New Theory of Cheese Science" edited by Yuji Nakazawa and Akiyoshi Hosono, page 129, Food Material Research Institute, September 1, the first year of Heisei, or "A JOHA (registered trademark) Guide Processed Cheese Manufacture", page 89, BK Ladenburgo GmbH, 1989, or the like).

For one thing, in the case of producing the aforementioned processed cheese, when a processed cheese is added as a material into materials including the natural cheese, emulsifying salts, and/or the like, the viscosity increase of melted materials treated in the emulsification treatment during production of the processed cheese is caused by the processed cheese (hereinafter, the property inducing the viscosity increase may be referred to as the viscosity increasing property).

In general, when the viscosity of the melted material after the emulsification treatment increases, the material becomes difficult to be transferred by means of a pump, and tends to cause various problems such as blockade of a filler. When the viscosity increases, it tends to cause the texture of an end product to be worsened, the hardness of the product to be increased, and the quality of the product to be significantly degraded.

That is, once the cheese-like food is processed by the emulsification treatment to produce a product, the product has a viscosity increasing property. As this result, when the product is added as a material of another food, for example, as a material of another cheese-like food, the viscosity of the melted material after the emulsification treatment for producing another cheese-like food increases, which causes many problems.

As described above, since the cheese-like food which is once processed by the emulsification treatment, such as the processed cheese, (hereinafter, described as a "processed cheese-like food"), has the viscosity increasing property, it has been regarded to be difficult to be used as a material of the food material, specifically the cheese-like food.

Therefore, the "processed cheese-like food" is not positively used as a food material, and even when used, the amount of the processed cheese-like food which can be added is limited.

In contrast, Japanese Unexamined Patent Application, First Publication No. Hei 9-154486 discloses a technique for producing a cheese-like food while suppressing the viscosity increase, in which a pre-cooked cheese (processed cheese) obtained from cheese remaining in a manufacturing line, and or defective cheese having defective shape, wrapping, content, or the like, is added as a material of the cheese-like food, into which an emulsifying salt and an emulsifier are added, and is then treated by the emulsification treatment.

The prior art has an object of simply reusing the pre-cooked cheese. Herein, the term "pre-cooked cheese" means the same as defined in Japanese Unexamined Patent Application, First Publication No. Hei 9-154486 described above.

In the prior art, since the emulsifying salt and the emulsifier are required to be added as materials in addition to the pre-cooked cheese, the prior art has problems in which materials permitted to be selected are limited at determining the combination of materials of the cheese-like food. Therefore, the prior art could not be applied except for the particular object to refuse the pre-cooked cheese.

Although the "processed cheese-like food" generally has a possibility to be useful for developing various foods by using it as a food material, techniques for using the "processed cheese-like food" without limitation has not been known. Therefore, the "processed cheese-like food" has not been positively used as a food material.

DISCLOSURE OF INVENTION

As a result of extensive research regarding techniques which enable the "processed cheese-like food" to be broadly used as food materials, the inventors of the present invention has completed the present invention by discovering new facts that viscosity increasing properties of the processed cheese-like food are decreased, when it is healed and melted at 120° C. or higher temperature, and that the viscosity increase of the processed cheese-like food heated and melted at 120° C. or higher temperature is suppressed, the texture of an end product including the processed cheese-like food is not worsened, and the hardness of the end product is not raised, when the processed cheese-like food heated and melted at 120° C. or higher temperature is used as a food material, specifically as a material of the cheese-like food.

An object of the present invention is to provide a food material which hardly induces the viscosity increase of a food including the food material after heating and melting the food, hardly reduces the quality of the food, and which can be broadly added in large quantities to various foods, specifically to the cheese-like foods, without any limitations.

Another object of the present invention is to provide a method of producing the food material described above.

Another object of the present invention is to provide a cheese-like food including the food material described above.

Another object of the present invention is to provide a method of producing the cheese-like food described above.

A first invention which solves the problems described above is a food material produced by heating and melting treatment of a processes cheese-like food at at least 120° C.

A second invention which solves the problems described above is a method of producing a food material, characterized in that a processed cheese-like food is subjected to heating and melting treatment at at least 120° C. and is then obtained as the food material.

In a preferable embodiment of the second invention, obtaining of the food material is carried out after rapid cooling treatment, and the rapid cooling treatment is carried out by cooling to 10° C. or less within 5 hours after the heating and melting treatment.

A third invention which solves the problems described above is a cheese-like food characterized in that a food material produced by subjecting a processed cheese-like food to heating and melting treatment at at least 120° C. is included.

A fourth invention which solves the problems described above is a method of producing a cheese-like food, characterized in that a processed cheese-like food is subjected to heating and melting treatment at at least 120° C., with which other materials are mixed, and the mixture is subjected to emulsification treatment, is formed, is cooled, and is then obtained as the cheese-like food.

BEST MODE FOR CARRYING OUT THE INVENTION

The first invention of the present invention is a food material produced by heating treatment of a processed cheese-like food.

Since the "processed cheese-like food" is subjected to the emulsification treatment at least one time, the processed cheese-like food has the viscosity increasing property in its original condition. Therefore, the processed cheese-like food is difficult to use as a food material, specifically as a material of a cheese-like food.

The invention is a food material produced by heating and melting treatment of this "processed cheese-like food" at 120° C. or more, preferably at 130° C. or more.

Herein, the "heating and melting treatment" is a special treatment required to obtain the food material of this invention, and the "heating and melting treatment" is distinguished from a treatment of heating and melting, which is generally carried out for producing a cheese-like food, and which is described as the "emulsification treatment. That is, when a food material is produced by the "heating and melting treatment" of a processed cheese-like food and the food material is then mixed with other cheese-like food, a treatment of heating and melting during processes of producing this other cheese-like food is indicated as the "emulsification treatment" in this invention.

As shown in examples described below, since the viscosity increasing property of the food material according to this invention is suppressed by the heating and melting treatment, when the obtained food material is specifically used as a material of the cheese-like food, the viscosity increase is scarcely induced during the emulsification treatment of the cheese-like food. As a result, processes after the emulsification treatment can be stably carried out without problems.

Since the food material according to this invention does not significantly degrade the texture of the end product, and scarcely increases the hardness, the food material does not affect the quality of the end product. Therefore, the food material can be mixed therein in large quantities.

Moreover, since this food material does not require the use of another particular additive as an indispensable ingredient, the combination of materials is not limited as it is in the aforementioned prior art.

The facts described above were first discovered by the present inventors, and the present inventors found a way out of the limited use of the "processed cheese-like food" as a new food material, which is conventionally limited in use as a food material because of the viscosity increasing property.

Since the food material according to this invention has less of a viscosity increasing property, the food material can be preferably mixed as a material of each kind of the cheese-like food, and the an amount of the food material mixed can be suitably determined. For example, even when the food material is mixed at a rate of 50% or more, the viscosity increase of the mixed cheese-like food during the emulsification treatment is suppressed, and the cheese-like food can be stably produced.

Moreover, the food material according to this invention may have added thereto a cooked flavor while suitably controlling the heating state in heating and melting at 120° C. or higher. The food material mixed with the cooked flavor can be preferably used as a material of each kind of food having an individual flavor, specifically as a material to develop cheese-like foods having special flavors.

In the food material according to this invention, specific examples of the "processed cheese-like food" before the heating and melting treatment include a processed cheese, a cheese food, a food including the cheese as the main component, and the like. Among these, the processed cheese is preferably used. This is because the processed cheese generally has the strongest viscosity increasing property, and thereby the food material produced from the processed cheese can derive the greatest benefits from this invention.

When the cheese food is used as the "processed cheese-like food" before heating and melting treatment, the content of the cheese is preferably 60% or more. When the foods including the cheese as the main component is used, the content of the cheese is preferably 30% or more. This is because the greater the content of the cheese, the greater the benefits of this invention the food material can receive as in the case of the processed cheese described above.

In contrast, although foods including the food material of this invention can be mixed with various foods, the foods may be preferably mixed with the "cheese-like food" such as the processed cheese, the cheese food, or other food including the cheese as the main component. Among these, the food may be the most preferably mixed with the processed cheese. This is because the processed cheese tends to be the most effectively influenced, the viscosity tends to be increased during the emulsification treatment, and the texture and the hardness of an end product tends to be degraded, when the processed cheese includes a material having a strong viscosity increasing property. That is, the benefits obtained by using the food material according to this invention is greatest.

When the foods including the food material according to this invention is the cheese food, the content of the cheese is preferably 60% or more. When the food is the food including the cheese as the main component, the contents of the cheese are preferably 30% or more.

The second invention of this invention is a method of producing the food material.

In the method according to this invention, the "processed cheese-like food" is subjected to the heating and melting treatment at at least 120° C., preferably at 130° C. or higher, which is obtained as the food material.

Although the heating and melting treatment can be carried out by using a conventional emulsifier or a conventional heating and cooling apparatus, an apparatus which can heat up to 120° C. or higher, preferably 130° C. or higher while holding and applying pressure above atmospheric pressure is preferably used. Specific examples of the apparatus include a batch type high speed shearing style emulsifier, a continuous heat exchanger with scraper, a twin-screw extruder, a tubular heater, or the like.

Although the heating and melting treatment and obtaining the food material may be carried out in the batch type apparatus, they are preferably carried out as continuously as possible. In this case, a continuous type apparatus is used.

Among these apparatuses, the most preferable apparatus is an apparatus combining an indirect heating type heat exchanger with a static mixer, such as an apparatus in which a static mixer is disposed at the inside of a tube of a tubular heater (such as an apparatus disclosed in Japanese Examined Patent Application, Second Publication No. Hei 7-26758).

Since the apparatus does not require directly blowing steam into the "processed cheese-like food" during the heating and melting treatment, the apparatus has advantages in which changes of properties of products are not caused by steam, and undesirable flavor is not caused in a step of evacuating blown steam. Moreover, the properties, after heating are satisfactory, and continuous operation can be maintained for a long time.

In contrast, preheating treatment may be carried out before the heating and melting treatment. An object of such preheating treatment is simply to enable the "processed cheese-like food" to be sent to an apparatus for the heating and melting treatment. For example, when the "processed cheese-like food" is sent by a pump, it is sent by the pump after suitably preheating in accordance with a kind of the pump or a kind of the "processed cheese-like food". In this case, the temperature for preheating is preferably room temperature or higher, and approximately 50° C. or less, and more preferably 30 to 50° C.

Moreover, although cooling treatment may be carried out after heating and melting, such cooling treatment is included in the "heating and melting treatment" according to this invention. That is, since liquid material at 120° C. or higher is generally at risk of boiling under atmospheric pressure, heating treatment may be terminated by cooling under the temperature to reduce the danger of boiling, and cooling in this case is included in the "heating and melting treatment" in this invention. This cooling is sufficiently carried out by decreasing the temperature to approximately 80 to 95%. Moreover, such cooling is preferably carried out by using a cooling apparatus which is generally provided in the apparatus described above.

In a preferable embodiment of the method of producing the food material according to this invention, rapid cooling treatment is further carried out after the heating and melting treatment.

The food material produced by the method according to this invention can be used as a material (specifically as a material of the cheese-like food) shortly after the heating and melting treatment, that is, in the high temperature condition. In this case, since the viscosity increasing property naturally possessed by the "processed cheese-like food" disappears, the food material can be used as a material of the cheese-like food without any problems.

However, it is naturally conceivable for the food material to be used as a material of another food shortly after obtaining the food material, in actual production steps. In this case, when the food material is allowed to cool by leaving it at room temperature, the viscosity may be increased again.

In order to prevent the increase again of the viscosity, the rapid cooling treatment is carried out after the heating and melting treatment, and preferably, the temperature is maintained at a low temperature (preferably at 10° C. or less) after the rapid cooling treatment. By carrying out the rapid cooling treatment, the increase again of the viscosity of the food material can be suppressed, and the food material can be used, after some time, as a material of a food, specifically as a material of the cheese-like food.

In this case, the "rapid cooling treatment" means to perform an operation for artificial cooling. That is, it does not mean to allow it to cool by itself by leaving at room temperature after the heating and melting treatment, but means to actively cool by performing an operation for cooling by means of a cooling apparatus, or by leaving it in a cooling space, or the like. For example, a method of immersing in cold water at 10° C. or less, holding in a refrigerator at 10° C. or less, or the like, can be applied.

Moreover, this rapid cooling treatment may be continuously carried out by passing through a cooling tunnel.

In a preferable embodiment of the method according to this invention, such rapid cooling treatment is carried out so as to decrease the temperature of the food material to 10° C. or lower temperature within 5 hours, preferably within 2 hours, after completing the heating and melting treatment.

As shown in examples described below, by rapidly cooling so as to decrease the temperature of the food material to 10° C. within 5 hours, preferably within 2 hours, after completing the heating and melting treatment of the "processed cheese-like food", the aforementioned increase again of the viscosity can be effectively prevented.

The third invention of this invention is a cheese-like food including the food material of the first invention described above.

Although the food material of the first invention can be included in various foods without any problems, the most preferable object with which the food material is mixed is the cheese-like food.

Such cheese-like food according to this invention can be produced by mixing the food material of the first invention as one part of the materials, which is followed by a conventional method.

In this case, materials generally well known can be used as other materials in addition to the food material of the first invention in accordance with a kind of the cheese-like food. By using the food material of the first invention, specific emulsifiers or the like are not required to be mixed.

Examples of such cheese-like food include the food including the cheese as the main component in addition to the processed cheese and the cheese food as described above. Specifically, a food having a form in which cheese is uniformly kneaded into compositions of the food is preferable as the food including the cheese as the main component. That is because effects of this invention which suppress the viscosity increasing properties can be best achieved when the foods have such a form. Examples of such foods include cheese sauce, cheese filling, cheese cake, cheese dessert, and the like.

The "processed cheese-like food" used for producing the food material of the first invention and the cheese-like food of an end product of this invention may be of different kinds, or may be of the same type, which are freely selected.

For example, it is possible for a processed cheese to be subjected to the heating and melting treatment at at least 120° C. to produce a food material according to this invention, and this food material is then mixed as a material of another processed cheese. In this case, the compositions of the former and the latter processed cheeses may be exactly the same. Moreover, when a cooked flavor is suitably added in the food material of the first invention, the cheese-like food can be developed into various kinds as products having individual flavors.

The fourth invention of this invention is a method of producing the cheese-like food.

First, a food material is produced from the "processed cheese-like food" according to the method of the second invention described above. The produced food material (that is, the food material of the first invention) is mixed with another materials, the mixture is subjected to the emulsification treatment, is formed, and is then cooled, to produce the cheese-like food.

The food material is preferably treated by mincing in advance, so as to enable the following steps to be easily performed.

As other materials in addition to the food material (that is, the food material of the first invention), required various components to be mixed in accordance with a kind of the cheese-like food. For example, cheeses, emulsifying salts, emulsifiers, spices, food colors, stabilizers, food flavorings, preservative agents, various seasonings, and/or the like can be mixed.

When the cheese is mixed as a material, natural cheese such as Gouda cheese, Cheddar cheese, or the like can be used.

When an end product is the cheese food or the food including the cheese as the main component, various fats such as vegetable fat, glucides, proteins, and/or the like can be further mixed therein. Moreover, in order to control the texture and the flavor of the product, additives such as stabilizers, gelatinizers, and/or the like can be mixed therein.

Although an emulsifying salt and/or an emulsifier can be mixed therein as other material, at least the emulsifying salt is preferably mixed therein.

As such an emulsifying salt, various phosphates such as monophosphate, diphosphate, polyphosphate, and the like, tartrate, citrate, bicarbonate, and the like, can be mentioned, these can be used alone or in combination. The contents of such emulsifying salts including emulsifying salts derived from the food material are 1 to 4%, preferably 1.5 to 3.0%.

As described above, the food material (that is, the food material of the first invention) and other materials are mixed, and the mixture is then subjected to the emulsification treatment. This emulsification treatment is carried out according to a conventional method, and is generally carried out by emulsifying while stirring and heating at 80 to 95° C.

As an apparatus for carrying out the emulsification treatment, various emulsifiers which are well known, such as a Vogel or Kustner type cooker, a horizontal cooker, a stephan cooker, a heat exchanger with scraper, a continuous processing cooker working only with direct heating steam, a jacket heating cooker, a twin-screw extruder, a tubular heater, or the like, can be used. Moreover, an apparatus combining an apparatus for exclusively heating with an apparatus for exclusively emulsifying may be used.

After completing the emulsification treatment, melted material is formed. A former forms the desired end product into a shape, and this is carried out by various methods, for example, by filling into a mold (for example, in the case of a block-form cheese-like food), by extruding from a nozzle (for example, in the case of a columnar cheese-like food), by rolling by means of a roller (for example, in the case of a slice-form cheese-like food), or the like.

When the cheese-like food takes the form of spread, the cheese-like food is filled into a container, which is included in the scope of the "forming" of this invention.

Although a formed material is cooled by a conventional method after forming, it is possible for it to be packaged before or after cooling. According to the aforementioned processes, the cheese-like food can be produced.

This invention described above provides a way of using the "processed cheese-like food", of which usage as a food material has been conventionally limited, as a material of various foods. In contrast, this invention can be applied to reuse of a pre-cooked cheese as in the prior art. In this case, the pre-cooked cheese is reused by being added into a material of a cheese after being subjected to the heating and melting treatment at at least 120° C. to produce the food material of this invention. In this case, the "other material" is preferably the same material as that of the pre-cooked cheese.

In the following, this invention will be explained in detail by way of experiments.

In the following experiments and examples, the "processed cheese-like food" which has not yet been processed into the food material of this invention may be referred to as a "starting material" as a matter of convenience for description.

Experiment 1

This experiment was carried out to investigate effects on the viscosity increasing property of the food material (the degree of the viscosity increase during the emulsification treatment of a product including the food material) and on the evaluation (the texture and the hardness) of the product including the food material, which are caused by the heating temperature during the heating and melting treatment of the "processed cheese-like food" to produce the food material.

1) Producing Samples
a) Producing Food Materials
a-1) Preparing a Starting Material 97 kg of Gouda type processed cheese which was a starting material of Example 3 described below (contents of water were 48.2%, contents of fat in solid contents were 46.0%) was used as a starting material of Experiment 1, and was minced by means of a chopper (manufactured by Nippon Carrier Industrial Co. Ltd.).

a-2) Producing Food Materials

Food materials were produced by the same apparatus and under the same conditions as those of Example 3 described below, except that each of the heating and melting treatment was carried out under eight kinds of conditions by changing the heating temperature in eight steps of 10° C. from 80 to 150° C. by means of a heat sterilization apparatus system (KID's cooker manufactured by KIKKOMAN CORP.).

After completing the heating and melting treatment 1 kg of each melted material was filled into a container which can be hermetically sealed (manufactured by Orihiro Co., Ltd.), was immersed in cold water at 10° C., was rapidly cooled for 2 hours untill the temperature at the center of the container became 1° C., and was then chilled overnight.

According to the steps described above, eight kinds of food materials (Food materials 1 to 8) were respectively produced by using 8 steps of the heating temperature during the heating and melting treatment.

Apart from these, a minced processed cheese (which is not subjected to the heating and melting treatment) was directly used as a food material (Comparative material 1).

b) Producing Processed Cheeses

Processed cheeses respectively including the food materials (Food materials 1 to 8, and Comparative material 1) were produced by the following method. The following method was applied to each of the food materials (Food materials 1 to 8, and Comparative material 1).

b-1) Mixing Other Materials 300.0 g of the food material were added into the chopper (manufactured by Nippon Carrier Industrial Co., Ltd.), into which 720.0 g of Gouda cheese (content of water 40.2%, content of fat in solid content 47.1%) and 240.0 g of Cheddar cheese (content of water 35.3%, content of fat in solid content 53.5%) were added, and which was then minced.

Into this, 6.0 g of trisodium citrate (manufactured by Saneigen F.F.I Co. Ltd.), 12.0 g of sodium pyrophosphate (manufactured by TAIYO KAGAKU CO., LTD.), 18.0 g of sodium polyphosphate (manufactured by TAIYO KAGAKU CO., LTD.) were added, and were then uniformly mixed.

b-2) Emulsification Treatment

The mixture was added into a Kustner type cheese melting cooker (manufactured by Tohoku Ohoe Industry Co. Ltd.), into which 204.0 g of dissolving water (including added water and steam for directly heating) for dissolving were added, and which was then heated to 85° C. while stirring at 120 rpm, was maintained for 3 minutes at 240 rpm, and was then deaerated at −45 kPa for 2 minutes while stirring at 120 rpm, to obtain a cheese emulsion. The content of water included in the obtained cheese emulsion was 48.2%, and the content of fat in the solid content of the obtained cheese emulsion was 46.0%.

b-3) Cooling 1 kg of each cheese emulsion was filled into a container which can be hermetically sealed (manufactured by Cow-pack Co. Ltd.), and was then cooled to 5° C. overnight, to obtain a cheese product.

As a result of carrying out the steps described above by using each of Food materials 1 to 8 and comparative material 1, nine kinds of processed cheese were finally produced, which were respectively Samples 1 to 8 and Comparative sample 1.

Apart from these, a processed cheese which does not include any food materials was obtained in a like manner, and the obtained general processed cheese was used as Comparative sample 2.

2) Test method
a) Determination of the Viscosity Increasing Property (Estimation of Viscosity)

In the steps for producing each of the aforementioned samples, when the emulsification treatment was terminated (that is, the deaeration was terminated), each of the cheese emulsion in the Kustner type cheese melting cooker was collected, and the viscosity was measured at 80° C. by means of No. 2 rotor of a B type viscometer (manufactured by Lyon Co. Ltd.).

b) Evaluation of Products
b-1) Evaluation of Texture

The texture of each of the obtained samples was estimated by each of 25 panelists of men and women in accordance to the following three categories:
A: soft and satisfactory
B: slightly hard
C: hard and fragile and the opinion supported by the most panelists was recognized as the product evaluation for the sample.

b-2) Measurement of the Hardness

Each sample was cut into blocks 3 cm in length, 3 cm in width, and 2 cm in height, and the temperature of the sample was controlled to be 10° C. by leaving the sample in an atmosphere of 10° C.

The hardness of the sample was measured twice under conditions such that the penetration speed was set to 5 mm/sec and the clearance was set to 5 mm by means of a creep meter (RE-3305 which is manufactured by Yamaden Co. Ltd.) provided with a cylindrical plunger having a diameter of 8 mm, and the average was calculated.

3) Test Results

Results of this experiment are shown in Table 1. Table 1 shows effects of the heating and melting temperature during production of the food material on the viscosity increasing property of the food material and on the evaluation of the product including the food material.

As shown in Table 1, Comparative sample 2 (a normal processed cheese which does not include the food material) became a cheese emulsion having a viscosity of 25,000 mPa·s after the emulsification treatment, and had final product evaluations in which the texture was A and the value of the hardness was $2.6 \times 10^6$ dyne/cm$^2$, which was small.

In contrast, Comparative sample 1 (which includes as the food material a processed processed cheese which was not given any treatment) became a cheese emulsion having a viscosity of 71,000 mPa·s after the emulsification treatment, and had final product evaluations in which the texture was C and the value of the hardness was $3.9 \times 10^6$ dyne/cm$^2$, which was high.

That is, it is clear that a significant viscosity increase is induced, and the evaluation of the product is worsened, when the untreated "processed cheese-like food" is mixed as the food material.

In contrast, among Samples 1 to 2, only when the heating and melting temperature during production of the food material was set to 120° C. or more (Samples 5 to 8), the viscosity of the cheese emulsion after the emulsification treatment was reduced, and the texture was B or more and the hardness was reduced in the evaluation of the products. That is, it was demonstrated that the viscosity increasing property of the food material was suppressed and the evaluation of products including the food material was not worsened, when the heating and melting temperature during production of the food material was set to 120° C. or more.

In contrast, although Comparative sample 2 (normal processed cheese) became a cheese emulsion having a viscosity of 25000 mPa·s after the emulsification treatment and had the final evaluation of the product in which the texture was A and the value of the hardness was $2.6 \times 10^6$ dyne/cm$^2$, as described above, it was demonstrated that the viscosity of the cheese emulsion including the food material and the evaluation of products were approximated to those of Comparative Sample 2, which were specifically preferable as the food material, when the heating and melting temperature during production of the food material was set to 130° C. or higher temperature (Samples 6 to 8).

As a result of this experiment, it was confirmed that the food material according to this invention was suitable for a material for food, since the viscosity increase of the product including the food material was suppressed during the emulsification treatment (that is, the viscosity increasing property was suppressed) and the quality of the product was not significantly worsened, by setting the temperature during the heating and melting treatment to 120° C. or more, and preferably to 130° C. or more.

TABLE 1

| Sample | | Viscosity increasing property | Evaluation of products | |
|---|---|---|---|---|
| Number | Heating temperature (° C.) | Viscosity (mPa · s) | Texture | Hardness (×10$^6$ dyne/cm$^2$) |
| 1 | 80 | 73000 | C | 4.0 |
| 2 | 90 | 74000 | C | 4.0 |
| 3 | 100 | 75000 | C | 4.1 |
| 4 | 110 | 66000 | C | 3.8 |
| 5 | 120 | 31000 | A to B | 2.8 |
| 6 | 130 | 23000 | A | 2.5 |
| 7 | 140 | 22000 | A | 2.4 |
| 8 | 150 | 21000 | A | 2.4 |
| Comparative 1 | — | 71000 | C | 3.9 |
| Comparative 2 | — | 25000 | A | 2.6 |

Experiment 2

This experiment was carried out to investigate effects on the viscosity increasing property of food materials (the degree of the viscosity increase during the emulsification treatment of products including the food materials) and on the evaluation (the texture and the hardness) of the products including the food materials, which were caused by the cooling speed after completing the heating and melting treatment.

1) Producing Samples
a) Producing Food Materials

Food material 9 and Food material 10 were produced according to a method similar to that of Example 3 described below, except that the rapid cooling treatment in the steps of producing the food material was carried out according to the following.

That is, the starting material was heated to 130° C. by means of the heat sterilization apparatus system (KID's cooker manufactured by KIKKOMAN CORP.), was then cooled to 80° C. to produced the food material in melting condition.

1 kg of each food material in a melted state was filled into a container which can be hermetically sealed (manufactured by Orihiro Co., Ltd.), was slowly cooled by leaving it in a refrigerator at 10° C. for 5 hours, and was then cooled overnight, to produced Food material 9.

Alternatively, it was slowly cooled by leaving it at room temperature for 2 hours, and was then cooled in a refrigerator overnight, to produce Food material 10.

When the temperatures of the center portions of the containers of the Food material 9 and Food material 10 were continuously recorded during cooling by means of a temperature probe, the temperature of the center portion of Food material 9 became less than 10° C. 5 hours after being filled, and the temperature of the center portion of Food material 10 became less than 10° C. 7 hours after being filled.

b) Producing Processed Cheeses

Food material 9 and Food material 10 were respectively mixed and were produced into Processed cheeses (Sample 9 and Sample 10) under conditions and at mixing proportion similar to those of Experiment 1 described above.

2) Test Method

The viscosities of cheese emulsions after the emulsification treatment (that is, after deaeration) in steps of producing Samples 9 and 10 were measured in the same way as that of Experiment 1 described above, and the evaluation of products obtained from the samples were estimated in the same way as that of Experiment 1.

3) Test Results

Results of this experiment are shown in Table 2. Table 2 is a table comparing the viscosity increasing properties and the evaluation of the products of Sample 6 and Samples 9 and 10 with each other.

As shown in Table 2, with regard to Samples 6 and 9, the viscosities were within a range from approximately 20000 to 35000 mPa·s, and the evaluation of the products, in which the texture was A to B or more and the hardness was 2.5 to $3.0 \times 10^6$ dyne/cm, was generally satisfactory. However, with regard to Sample 10, the viscosity was 41000 mPa·s, the evaluation of the texture of the product was B to C, and the evaluation of the hardness of the product was $3.4 \times 10^6$ dyne/cm$^2$, from which it was proved that the viscosity increasing property was increased again, and the suitability as a food material was slightly decreased.

As a result of this experiment, it was proved that the increase again of the viscosity increasing property was suppressed, the product was evaluated to be better, and a more desirable food material was produced, by the rapid cooling treatment which decreases the temperature to 1° C. within 5 hours, preferably within 2 hours, after the heating and melting treatment for producing the food material of this invention.

TABLE 2

| Sample | | Viscosity increasing property | Evaluation of products | |
|---|---|---|---|---|
| Number | Time required for cooling to 10° C. | Viscosity (mPa · s) | Texture | Hardness ($\times 10^6$ dyne/cm$^2$) |
| 6 | 2 hours | 23000 | A | 2.5 |
| 9 | 5 hours | 34000 | A to B | 3.0 |
| 10 | 7 hours | 41000 | B to C | 3.4 |

Although this invention will be explained in detail by way of examples in the following, this invention is not limited to the following examples.

EXAMPLES

Example 1

(Food Material Produced by Subjecting a Processed Cheese Having a Parmesan Flavor to the Heating and Melting Treatment)
1) Producing Starting Materials (that is, "Processed Cheese-Like Foods" Described in Claims)

30.0 kg of Cheddar cheese (content of water 35.3% and content of fat in solid content 53.5%) and 20.0 kg of Gouda cheese (content of water 40.2% and content of fat in solid content 47.1%) were added into a chopper (manufactured by Nippon Carrier Industrial Co., Ltd.), and were then minced, into which 20.0 kg of powdered Parmesan cheese (content of water 16.1% and content of fat in solid content 39.7%), 2.0 kg of sodium polyphosphate (manufactured by TAIYO KAGAKU CO., LTD) as an emulsifying salt, 0.5 kg of sodium pyrophosphate (manufactured by TAIYO KAGAKU CO., LTD.), and 1.0 kg of trisodium citrate (manufactured by Saneigen F-F-I Co., Ltd.) were added, and were then uniformly mixed.

This mixture was added into a Kustner type cheese melting cooker (manufactured by Tohoku Ohoe Industrial Co., Ltd.), into which 26.5 kg of dissolving water (including added water and steam for directly heating) was added, was heated to 85° C. while stirring at 120 rpm, was maintained for 3 minutes while stirring at 240 rpm under this condition, and was then deaerated for 2 minutes at −45 kPa while stirring at 120 rpm, to produce cheese emulsions in satisfactory emulsification condition.

Each of 1 kg of this cheese emulsion was respectively filled into a container which can be hermetically sealed (manufactured by Cowpack Co., Ltd.), was cooled overnight at 5° C. in a refrigerator, to produce 97 starting materials made from the Cheddar type processed cheese. Content of water in the obtained starting material was 48.5% and content of fat in the solid content was 44.0%.
2) Producing Food Materials of this Invention 97 starting materials described above (that is, the "processed cheese-like foods" described in claims) were taken out from the containers, were added into a chopper (manufactured by Nippon Carrier Industrial Co., Ltd.), and were then minced.

The minced starting materials were added into a hopper provided with a jacket and a stirrer (manufactured by Kajihara Industrial Co., Ltd.), were preheated until the temperature of the materials became to 40 to 50° C. by indirect heating of the jacket, were added into a heat sterilization apparatus system (KID's cooker manufactured by KIKKOMAN CORP.) by means of a mono pump (manufactured by Hyoshin Soubi Co., Ltd.), were subjected to the heating and melting treatment at 130° C., and were then cooled to 80° C. (that is, the "heating and melting treatment" described in claims).

Each of 1 kg of the melted material after cooling was filled into a container which can be hermetically sealed (manufactured by Orihiro Co., Ltd.), was immersed in cold water at 10° C., and was subjected to the rapid cooling treatment for approximately 2 hours until the temperature of the center portion of the container became 10° C. (that is, the "rapid cooling treatment" as recited in the claims).

Thereafter, they were cooled overnight in an atmosphere of 5° C. or less to produce 95 food materials of this invention, which were produced by using the processed cheese having a parmesan flavor as the starting material. Content of water included in the produced food material was 48.5% and content of fat in the solid content of the produced food material was 44.0%.

Example 2

(Processed Cheese Including the Food Material of Example 1)

20.0 kg of the food material of Example 1 described above, 48.0 kg of Cheddar cheese (content of water 35.3% and content of fat in solid content 53.5%), and 16.0 kg of Gouda cheese (content of water 40.2% and content of fat in solid content 47.1%) were added into a chopper (manufactured by Nippon Carrier Industrial Co., Ltd.), and were minced, into which 1.2 kg of sodium polyphosphate as an emulsifying salt, 0.4 kg of sodium pyrophosphate, and 0.8 kg of trisodium citrate were added, and were uniformly mixed.

This mixture was added into a Kostner type cheese melting cooker (manufactured by Tohoku Ohoe Industrial Co., Ltd.), into which 13.6 kg of dissolving water (including added water and steam for directly heating) was added, was heated to 85° C. while stirring at 120 rpm, was maintained for 3 minutes under this condition while stirring at 240 rpm, was then deaerated for 2 minutes at −45 kPa while stirring at 120 rpm, to produce cheese emulsions in satisfactory emulsification condition (that is, the "emulsification treatment" as recited in the claims).

When the viscosity of the cheese emulsions were measured in the same way as that used in the aforementioned experiment 1, the viscosity was 25000 mPa·s, and the viscosity increase was not observed.

Each of 1 kg of the cheese emulsions was filled into a container which can be hermetically sealed (manufactured by Orihiro Co., Ltd.) (that is, the "forming" as recited in the claims), and were cooled overnight at 5° C. in a refrigerator (that is, the "cooling" as recited in the claims). Thus, 97 processed cheese products in containers (that is, the "cheese-like food" of this invention) were obtained. Content of water included in the obtained processed cheese product was 46.8%, and content of fat in solid content of the obtained processed cheese product was 48.2%.

As a result of tasting of the processed cheese, the processed cheese had a suitably soft texture and satisfactory properties as a product.

Example 3
(Food Material Produced by Subjecting a Gouda Type Processed Cheese to the heating and Melting Treatment)
1) Producing Starting Materials (That is, the "Processed Cheese-Like Food" as Recited in the Claims)

60.0 kg of Gouda cheese (content of water 40.2% and content of fat in solid content 47.1%) and 20.0 kg of Cheddar cheese (content of water 35.5% and content of fat in solid content 53.5%) were added into a chopper (manufactured by Nippon Carrier Industrial Co. Ltd.), and were minced, into which 0.5 kg of trisodium citrate, 1.0 kg of sodium pyrophosphate, and 1.5 kg of sodium polyphosphate were added, and were uniformly mixed.

This mixture was added into a Kustner type cheese melting cooker (manufactured by Tohoku Ohoe Industrial Co., Ltd.), into which 17.0 kg of dissolving water (including added water and steam for directly heating) was added, which was heated to 85° C. while stirring at 120 rpm, was maintained for 3 minutes under this condition while stirring at 240 rpm, and was then deaerated for 2 minutes at −45 kPa while stirring at 120 rpm, to produce cheese emulsions in satisfactory emulsification condition.

Each of 1 kg of the cheese emulsions was filled into a container which can be hermetically sealed (manufactured by Cowpack Co., Ltd.), and was cooled overnight at 5° C. in a refrigerator. Thus, 97 starting materials produced from the Gouda type processed cheese were obtained. Content of water included in the obtained starting material was 48.2% and content of fat in solid contents of the obtained starting material was 46.0%.

2) Producing Food Materials of this Invention 97 starting materials described above (that is, the "processed cheese-like food" as recited in the claims) were taken out from respective containers, were added into a chopper (manufactured by Nippon Carrier Industrial Co., Ltd.), and were minced.

The minced starting materials were added into a hopper provided with a jacket and a stirrer (manufactured by Kajihara Industrial Co., Ltd.), were preheated by indirect heating of the jacket until the temperature of the materials became 40 to 50° C., were supplied into a heat sterilization apparatus system (KID's cooker manufactured by KIKKOMAN CORP.) by means of a mono pump (manufactured by Hyoshin Soubi Co., Ltd.), were subjected to the heating and melting treatment at 130° C., and were cooled to 80° C. (that is, the "heating and melting treatment" as recited in the claims).

Each of the 1 kg of the melted material after cooling was filled into a container which can be hermetically sealed (manufactured by Orihiro Co., Ltd.), was immersed in cold water at 10° C., and was subjected to a rapid cooling treatment for 2 hours until the temperature of the center portion of the container became 10° C. (that is, the "rapid cooling treatment" as recited in the claims).

According to steps described above, 95 food materials were produced from the Gouda type processed cheese as a starting material.

Example 4
(Food Material Produced by Subjecting a Gouda Type Cheese Food to the Heating and Melting Treatment)
1) Producing Starting Materials (that is, the "Processed Cheese-Like Food" as Recited in the Claims)

60.0 kg of Gouda cheese (content of water 40.2% and content of fat in solid content 47.1%) were added into a chopper (manufactured by Nippon Carrier Industrial Co., Ltd.), and were minced, into which 5.0 kg of hardened palm oil, 5.0 kg of milk protein, 5.0 kg of calcium caseinate, 1.0 kg of sodium polyphosphate as an emulsifying salt, 0.5 kg of sodium pyrophosphate, and 1.0 kg of trisodium citrate were added and were uniformly mixed.

This mixture was added into a Kustner type cheese melting cooker (manufactured by Tohoku Ohoe Industrial Co., Ltd.), into which 22.5 kg of dissolving water (including added water and steam for directly heating) was added, which was heated to 85° C. while stirring at 120 rpm, was maintained for 5 minutes under this condition while stirring at 240 rpm, was then deaerated for 2 minutes at −45 kPa while stirring at 120 rpm, to produce cheese emulsions in satisfactory emulsification condition.

Each of the 1 kg of the cheese emulsions was filled into a container which can be hermetically sealed (manufactured by Cowpack Co., Ltd.), and was cooled overnight at 5° C. in a refrigerator. Thus, 97 starting materials were produced from the Cheddar type cheese food. Content of water included in the obtained starting material was 47.3% and content of fat is solid content of the obtained starting material was 41.8%.

2) Producing Food Materials of this Invention 97 starting materials described above (that is, the "processed cheese-like food" as recited in the claims) were taken out from respective containers, were added into a chopper (manufactured by Nippon Carrier Industrial Co., Ltd.), and were minced.

The minced starting materials were added into a hopper provided with a jacket and a stirrer (manufactured by Kajihara Industrial Co., Ltd.), were preheated by indirect heating of the jacket until the temperature of the materials became 40 to 50° C., were supplied into a heat sterilization apparatus system (KID's cooker manufactured by KIKKOMAN CORP.) by means of a mono pump (manufactured by Hyoshin Soubi Co., Ltd.), were subjected to the heating and melting treatment at 130° C., and were cooled to 80° C. (that is, the "heating and melting treatment" as recited in the claims).

Each of the 1 kg of the melted material after cooling was filled into a container which can be hermetically sealed (manufactured by Orihiro Co., Ltd.), was immersed in cold water at 10° C., and was subjected to rapid cooling treatment for 2 hours until the temperature of the center portion of the container became 10° C. (that is, the "rapid cooling treatment" as recited in the claims).

According to the steps described above, 95 food materials of this invention were produced from the Gouda type cheese food as a starting material. Content of water included in the produced food material was 47.5% and content of fat in solid content of the produced food material was 46.1%.

Example 5
(A Cheese Food Product Including the Food Material of Example 4)

40.0 kg of the food material of Example 4 described above and 95.0 kg of Cheddar cheese (content of water 35.5% and content of fat in solid content 53.5%) were added into a chopper (manufactured by Nippon Carrier Industrial Co., Ltd.), and were minced, into which 10.0 kg of hardened palm oil, 6.0 kg of milk protein, 5.0 kg of calcium caseinate, 1.6 kg of sodium polyphosphate as an emulsifying salt, 0.8 kg of sodium pyrophosphate, and 1.6 kg of trisodium citrate were added and were uniformly mixed.

This mixture was added into a Kustner type cheese melting cooker (manufactured by Nippon Dairy Machine Co., Ltd.), into which 40.0 kg of dissolving water (including added water and steam for directly heating) was added, which was heated to 85° C. while stirring at 120 rpm, was maintained for 5 minutes under this condition while stirring at 240 rpm, and was then deaerated for 2 minutes at −45 kPa while stirring at 120 rpm, to produce a cheese emulsion food in satisfactory emulsification condition (that is, the "emulsification treatment" as recited in the claims).

The viscosity of the cheese emulsion food was 20.000 mPa·s, and no significant viscosity increase was observed.

Each of the 1 kg of the produced cheese emulsion food was filled into a container which can be hermetically sealed (manufactured by Cowpack Co., Ltd.) (that is, the "forming" as recited in the claims), and was cooled overnight at 5° C. in a refrigerator (that is, the "cooling" as recited in the claims), to produce 197 cheese food products (the cheese-like foods of this invention).

Content of water included in the produced cheese food product was 46.6% and content of fat in solid content of the produced cheese food product was 48.6%. As a result of tasting the produced cheese food, it had a suitably soft texture and satisfactory properties as a product.

Example 6
(A Food Material Produced by Subjecting an Emmental Type Cheese-Like Spread Food to the Heating and Melting Treatment)
1) Producing Starting Materials (that is, the "Processed Cheese-Like Food" as Recited in the Claims).

30.0 kg of Emmental cheese (content of water 37.5% and content of fat in solid content 48.0%) and 15.0 kg of cream cheese (content of water 55.1% and content of fat in solid content 76.2%) were added into a chopper (manufactured by Nippon Carrier Industrial Co., Ltd.), and were minced, into which 25.0 kg of hardened palm oil, 2.0 kg of sodium polyphosphate as an emulsifying salt, and 1.0 kg of trisodium citrate were added and were uniformly mixed.

This mixture was added into a high speed cutter mixer (manufactured by Stephan Co., Ltd.), into which 27.0 kg of dissolving water (including added water and steam for directly heating) was added, which was heated to 85° C. while stirring at 1500 rpm, and was maintained for 5 minutes while stirring at 1500 rpm, to produce a cheese emulsion spread in satisfactory emulsification condition.

Each 0.5 kg of the produced cheese emulsion spread was filled into a container which can be hermetically sealed (manufactured by Cowpack Co., Ltd.), and was cooled overnight at 5° C. in a refrigerator. Thus, 195 starting materials were produced from the Emmental type cheese-like spread food having a satisfactory spreadability. Content of water included in the produced starting material was 46.6% and content of fat in solid content of the produced starting material was 73.3%.

2) Producing a Food Material 195 starting materials described above (that is, the processed cheese-like food" described above) were taken out from respective containers to be temporarily stored, were supplied into the heat sterilization apparatus system (KID's cooker manufactured by KIKKOMAN CORP.) used in Example 1, and were cooled to 80° C. after heating to 130° C. under the same conditions as that used in Example 1 (that is, the "heating and melting treatment" as recited in the claims).

Each 1 kg of the melted material after cooling was filled into a container which can be hermetically sealed (manufactured by Orihiro Co., Ltd.), was immersed in cold water at 10° C., was subjected to the rapid cooling treatment for 2 hours until the temperature of the center portion of the container became 10° C. (that is, the "rapid cooling treatment" as recited in the claims), was then cooled overnight at 5° C. in a refrigerator, to produce 95 food materials of this invention from the Emmental type cheese-like spread food as a starting material. Content of water included in the produced food materials was 46.6% and content of fat in solid content of the produced food material was 73.3%.

Example 7
(A Cheese-Like Spread Food Including the Food Material of Example 6)

25.0 kg of the food material of Example 6 described above were added into a chopper (manufactured by Nippon Carrier Industrial Co., Ltd.), into which 20.0 kg of Gouda cheese (content of water 40.2% and content of fat in solid content 47.1%) and 12.0 kg of cream cheese (content of water 55.1% and content of fat in solid content 76.2%) %% ere further added, and were minced, into which 20.0 kg of hardened palm oil, 1.5 kg of sodium polyphosphate as an emulsifying salt, and 0.8 kg of trisodium citrate were added and were uniformly mixed.

This mixture was added into a high speed cutter mixer (manufactured by Stephan Co. Ltd.), into which 20.7 kg of dissolving water (including added water and steam for directly heating) was added, which was heated to 85° C. while stirring at 1500 rpm, and was maintained for 5 minutes while stirring at 1500 rpm, to produce a cheese-like emulsion spread food in satisfactory emulsification condition (that is, the "emulsification treatment" as recited in the claims).

The viscosity of the cheese-like emulsion spread food was 6000 mPa·s and the viscosity was not significantly increased.

Each 0.5 kg of the produced cheese-like emulsion spread food was filled into a container which can be hermetically sealed (manufactured by Cowpack Co., Ltd.) (that is, the "forming" as recited in the claims), and was cooled overnight at 5° C. in a refrigerator (that is, the "cooling" as recited in the claims), to produce 195 cheese-like spread foods (cheese-like foods of this invention). Content of water included in the produced cheese-like spread food was 47.1% and content of fat in solid content of the produced cheese-like spread food was 74.7%. The produced cheese-like spread food had a suitable softness, a satisfactory spreadability, smoothness, and meltability in the mouth, and properties as a product were generally satisfactory.

Example 8
(A Cheese Food Product Including the Food Material of Example 3)

20.0 kg of the food material of Example 3 described above and 47.5 kg of Cheddar cheese (content of water 35.3% and content of fat in solid content 53.5%) were added into a chopper (manufactured by Nippon Carrier Industrial Co., Ltd.), and were minced, into which 5.0 kg of hardened palm oil, 3.0 kg of milk protein, 2.5 kg of calcium caseinate, 0.8 kg of sodium polyphosphate as an emulsifying salt, 0.4 kg of sodium pyrophosphate, and 0.8 kg of trisodium citrate were added and were uniformly mixed.

This mixture was added into a Kustner type cheese cooker (manufactured by Tohoku Ohoe Industrial Co. Ltd.), into which 20.0 kg of dissolving water (including added water and steam for directly heating) was added, which was heated to 85° C. while stirring at 120 rpm, was maintained for 5 minutes under this condition while stirring at 240 rpm, and was then deaerated for 2 minutes at 45 kPa while stirring at 120 rpm, to produce a cheese emulsion food in satisfactory emulsification condition (that is, the "emulsification treatment" described above).

The viscosity of the cheese emulsion food was 22,000 mPa·s, and the viscosity was not significantly increased.

Each 1 kg of the produced cheese emulsion food was filled into a container which can be hermetically sealed (manufactured by Cowpack Co., Ltd.) (that is, the "forming" as recited in the claims), and was cooled overnight at 5° C. in a refrigerator (that is, the "cooling" as recited in the claims), to produce 97 cheese food products (cheese-like foods of this invention).

Content of water included in the produced cheese food product was 46.8% and content of fat in solid content of the produced cheese food product was 49.4%. As a result of tasting the produced cheese food, it had a suitably soft texture and satisfactory properties as a product.

Example 9
(A Cheese Spread Like Product Including the Food Material of Example 3)

20.0 kg of the food material of Example 3 described above was added into a chopper (manufactured by Nippon Carrier Industrial Co., Ltd.), into which 15.0 kg of Cheddar cheese (content of water 35.3% and content of fat in solid content 53.5%) and 10.0 kg of cream cheese (content of water 55.1% and content of fat in solid content 76.2%) were further added, and were minced, into which 25.0 kg of hardened palm oil, 1.5 kg of sodium polyphosphate as an emulsifying salt, and 0.8 kg of trisodium citrate were added and were uniformly mixed.

This mixture was added into a high speed cutter mixer (manufactured by Stephan Co., Ltd.), into which 27.7 kg of dissolving water (including added water and steam for directly heating) was added, which was heated to 85° C. while stirring at 1500 rpm, and was maintained for 5 minutes while stirring at 1500 rpm, to produce a cheese-like emulsion spread food in satisfactory emulsification condition (that is, the "emulsification treatment" as recited in the claims).

The viscosity of the cheese emulsion food was 6,500 mPa·s, and the viscosity was not significantly increased.

Each 0.5 kg of the produced cheese-like emulsion spread food was filled into a container which can be hermetically sealed (manufactured by Cowpack Co., Ltd.) (that is, the "forming" as recited in the claims), and was cooled overnight at 5° C. in a refrigerator (that is, the "cooling" as recited in the claims), to produce 195 cheese-like spread foods (cheese-like foods of this invention).

Content of water included in the produced cheese food product was 48.3% and content of fat in solid content of the produced cheese food product was 74.2%. The produced cheese food product had a soft suitable for a spread, and had a satisfactory spreadability, smoothness, and meltability in the mouth, and properties as a product were generally satisfactory.

INDUSTRIAL APPLICABILITY (1) The food material of this invention does not cause the viscosity increase after heating and melting, even when it is mixed as a material of a cheese-like food, and properties of a product including the food material are satisfactory. Thus, the food material can be mixed in various kinds of cheese-like foods in large quantities without limitation.

(2) The food material of this invention can be mixed in foods other than the cheese-like foods, and has extremely wide use.

(3) Although the "processed cheese-like food" is mixed in the cheese-like food of this invention according to the method of producing the cheese-like food, the viscosity increase after heating and melting is suppressed, and the cheese-like food can be produced in stable steps. Moreover, the produced cheese-like food has a satisfactory soft texture and can maintain high quality.

(4) This invention enables the "processed cheese-like food", which is conventionally limited in use as a food material because of the viscosity increasing property thereof, to be positively used as a new food material. Moreover, this invention can be applied with the view of reusing a pre-cooked cheese.

What is claimed is:

1. A method of producing a raw material to be reused for a processed cheese or a cheese food which does not cause a viscosity increase, wherein a processed cheese or a cheese food, which has been previously treated by an emulsification treatment, is subjected to heating and melting treatment at at least 120° C. and is then subjected to a rapid cooling treatment carried out by cooling to 10° C. or less within 5 hours after the heating and melting treatment and is then obtained as the raw material to be reused for a processed cheese or a cheese food.

2. A method of producing a processed cheese or a cheese food including a reused raw material which does not cause a viscosity increase and is produced from another processed cheese or a cheese food which has been previously treated by an emulsification treatment, wherein said another processed cheese or a cheese food is subjected to a heating and melting treatment at at least 120° C., and is then subjected to a rapid cooling treatment carried out by cooling to 10° C. or less within 5 hours after the heating and melting treatment and is then used as a reused raw material, with which other materials are mixed, the mixture is subjected to an emulsification treatment, is formed, is cooled, and is then obtained as a processed cheese or a cheese food.

* * * * *